Figure 1:
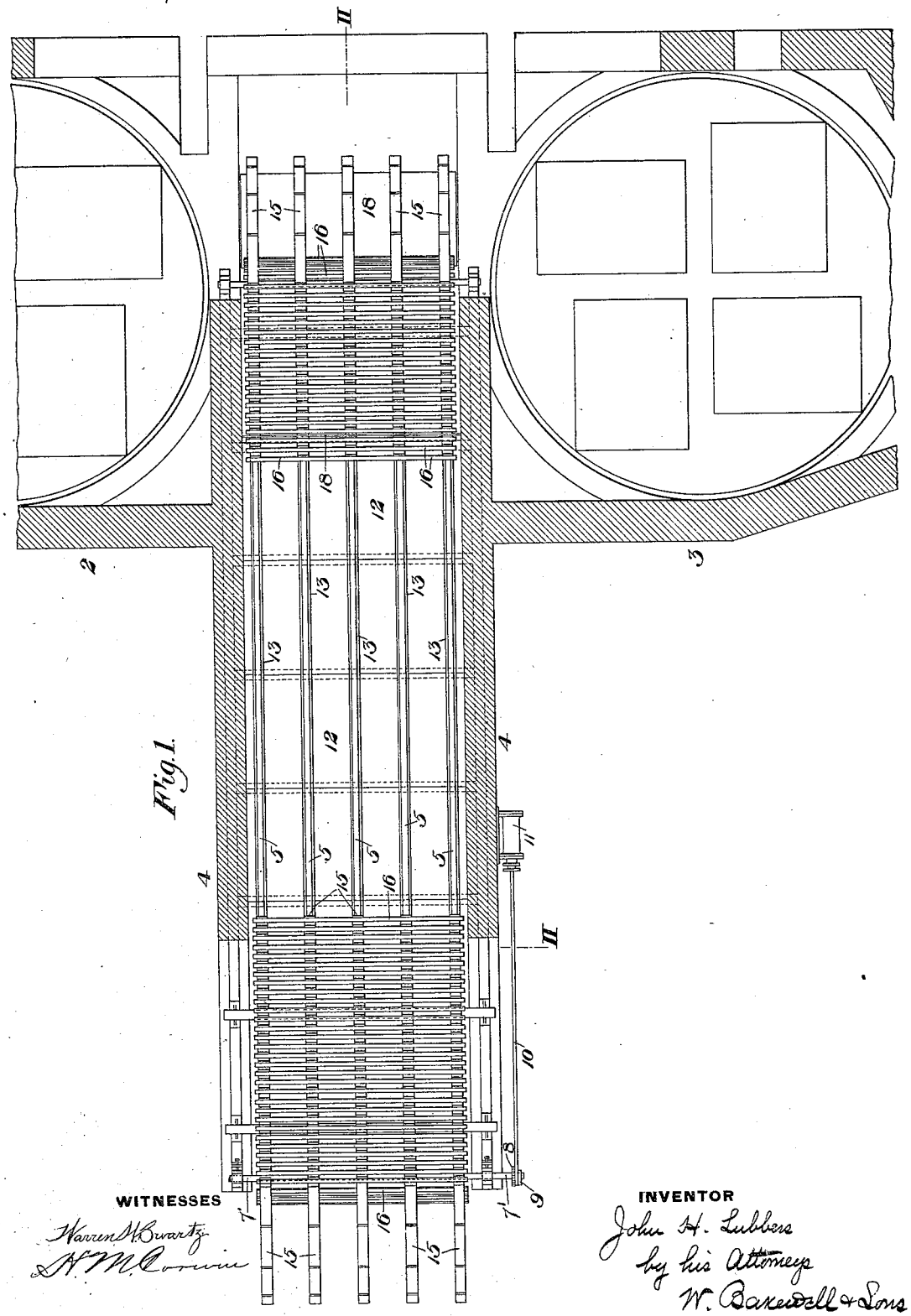

(No Model.) 3 Sheets—Sheet 1.
J. H. LUBBERS.
LEER FOR GLASS SHEETS.

No. 555,047. Patented Feb. 18, 1896.

WITNESSES
INVENTOR
John H. Lubbers
by his Attorneys
W. Bakewell & Sons

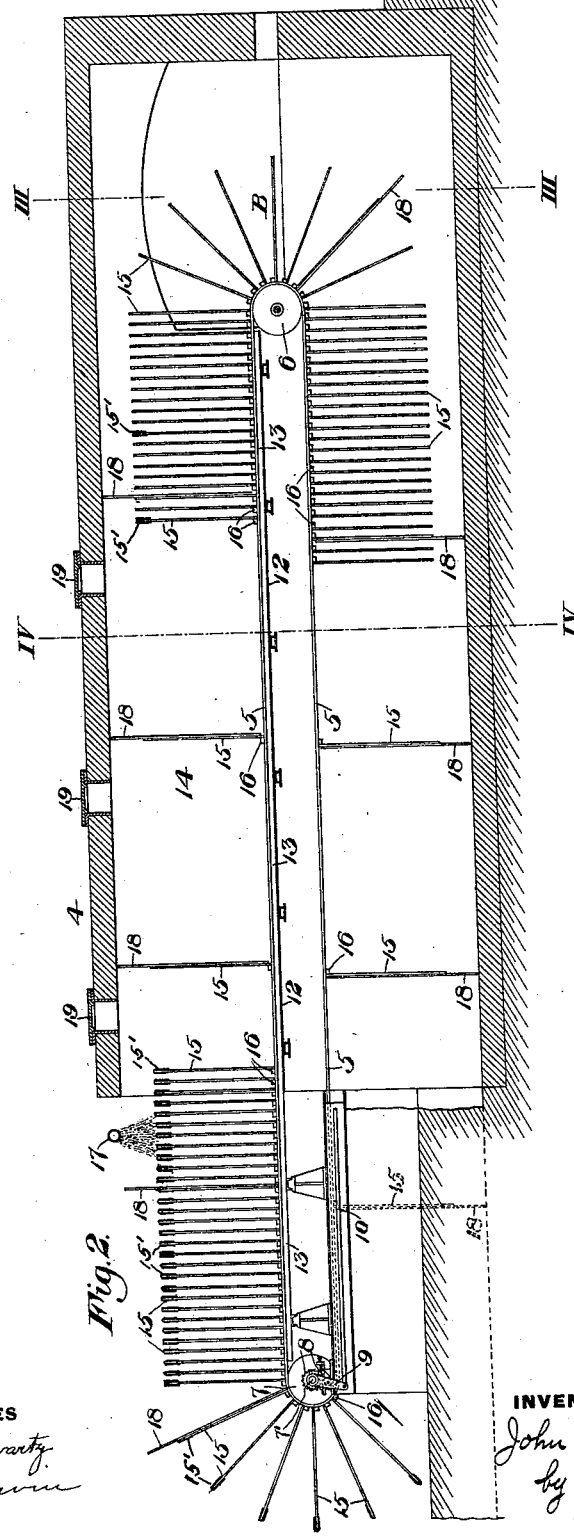

(No Model.) 3 Sheets—Sheet 3.
J. H. LUBBERS.
LEER FOR GLASS SHEETS.
No. 555,047. Patented Feb. 18, 1896.
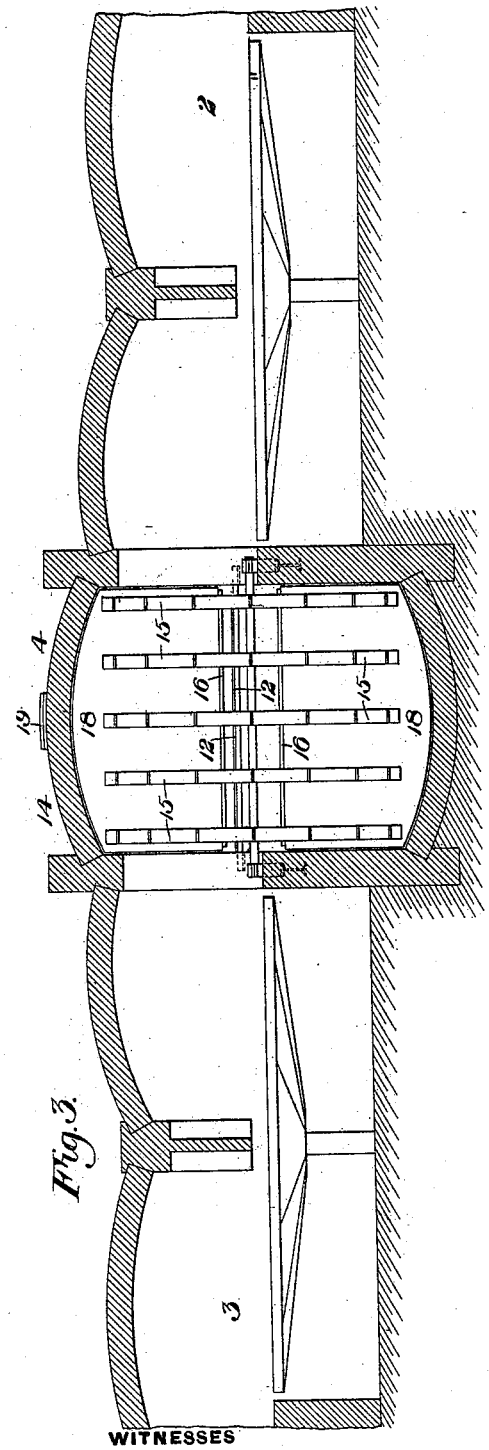
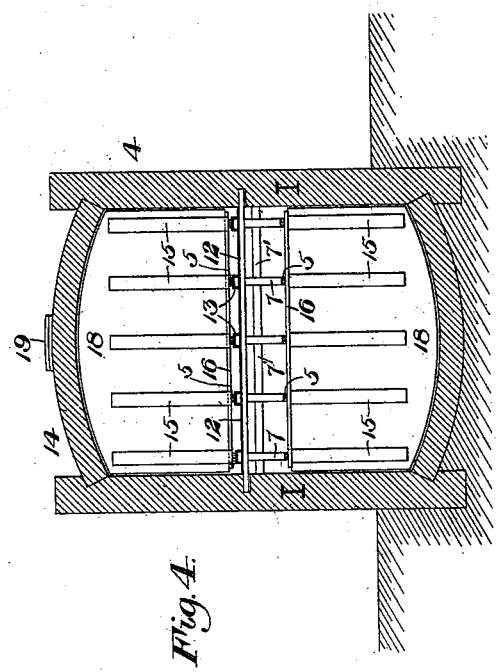
WITNESSES
INVENTOR
John H. Lubbers
by his Attorneys
W. Bakewell & Sons

UNITED STATES PATENT OFFICE.

JOHN H. LUBBERS, OF PITTSBURG, PENNSYLVANIA.

LEER FOR GLASS SHEETS.

SPECIFICATION forming part of Letters Patent No. 555,047, dated February 18, 1896.

Application filed April 19, 1895. Serial No. 546,397. (No model.)

*To all whom it may concern:*

Be it known that I, JOHN H. LUBBERS, of Pittsburg, in the county of Allegheny and State of Pennsylvania, have invented a new and useful Improvement in Leers for Glass Sheets, of which the following is a full, clear, and exact description.

The object of my invention is to provide a leer for annealing sheet-glass which shall be of large capacity and which shall be very efficient for the purpose.

The invention is shown in the accompanying drawings, in which—

Figure 1 illustrates in horizontal section a leer having glass-carrying mechanism constructed in accordance with my invention, said mechanism being shown in plan view. Fig. 2 is a vertical longitudinal section on the line II II of Fig. 1, showing such mechanism in side elevation. Figs. 3 and 4 are vertical cross-sections on the lines III III and IV IV, respectively, of Fig. 2.

In Figs. 1 and 2 I have omitted some of the arms 15 for purposes of illustration.

The capacity of my improved leer is so great that I can use it in connection with two flattening-ovens when desired, and I have shown such construction in the drawings, wherein 2 3 represent the flattening-ovens, having the usual flattening-stones therein, and 4 represents the leer or tunnel leading from the ovens and adapted to afford means for gradually cooling the glass sheets as they are carried from one end to the other.

The mechanism which I employ for conveying the glass consists of endless chains or other flexible connections 5 5, of which there are several set parallel to each other. I have shown five such endless chains passing around sprocket-wheels 6 7, placed respectively at the outside of the delivery end of the leer and at the receiving end of the leer next to the flattening-oven. The shaft 7' of one set of sprocket-wheels is rotated by suitable mechanism. For example, the pawl and ratchet 8, which by means of the lever 9 and connecting-rod 10, may be connected to a suitable motor 11, or the shaft may be rotated by hand, the object being to cause the chains to travel around the sprocket-wheels and through the leer. The upper branches of the endless chains are separated from the lower branches by means of plates 12, which extend horizontally between longitudinal bars 13 and constitute a floor arranged in the leer under the several chains and adapted to support the same, so that the chamber or port 14 of the leer above said bars and plates is cut off from the lower part of the leer, the purpose being to prevent too great draft and to keep cold air from access to the glass.

For the purpose of supporting the glass, I employ rods or arms 15, which project vertically from the links of the endless chains, said arms being arranged in parallel cross-rows so as to form racks between which the glass sheets may be placed on edge vertically. At the base of the spaces between the racks I fix to the chains blocks or cushions 16 of asbestos, and I prefer to also provide the arms 15 on both sides with asbestos facings 15'. The several arms on each chain are separated from each other, preferably about two inches more or less, and the successive arms are fixed to different links of the chain so that they may diverge at the sprocket-wheels, as hereinafter explained.

As shown in Fig. 2, as the endless chains pass around the sprocket-wheels the arms 15 spread and diverge from the wheels radially, so as to make it convenient to insert and remove the sheets of glass.

In operation of the apparatus, the flattener having flattened the sheet of glass in one of the flattening-ovens 2 3 and the flattened sheet having been brought by revolution of the flattening-wheel into the chamber of the oven next to the entrance of the leer, the flattener lifts up the glass sheet on his fork and deposits it between two of the divergent sets of arms in the place marked B in Fig. 2. Then by operating the valve of the motor 11 the endless chains are caused to move forward one space and the glass sheet above mentioned is carried with them. The flattener places the next flattened sheet of glass within the next rack, the chains are again advanced one space, and so the operation proceeds until the leer is filled with a series of glass sheets supported on the traveling chains, and as the chains move forward the sheets are annealed by reason of the gradual lessening temperature to which they are subjected in their passage. As the glass sheets arrive at the delivery end of the leer, they may be sprayed by an acid solution discharged upon them by a water-pipe 17, though this is not essential, and when they reach the end of the course of the chains, where the arms 15 diverge from the sprocket-wheels, the sheets are removed from the arms, or they may be removed at any point of the travel of the chains after they leave the leer.

For the purpose of cutting off drafts through the leer and preventing chilling and imperfect annealing of the glass, I place at intervals on the cross-series of arms—say about every twentieth cross-series—a sheet of asbestos, sheet metal, or other suitable material, which extends substantially across the leer and from the chains to or nearly to the crown of the leer. These sheets move along with the chains and constitute movable walls, dividing the leer into chambers, and preventing the evil effects of drafts upon the glass. The top of the leer is also provided with outlet-holes 19, which may be provided with dampers by which the movable chambers, into which the leer is divided by the sheets 18, are gradually reduced in temperature as they travel from one end of the leer to the other.

The advantages of my invention will be appreciated by those skilled in the art.

The apparatus is simple, and it enables glass to be annealed in quantity with great rapidity and with good results.

The number of sheets which can be placed in the leer makes it specially desirable for annealing heavy glass.

Within the scope of my invention as defined in the following claims modifications may be made in the form and arrangement of the parts, since

What I claim is—

1. A leer for annealing sheet-glass, having an endless chain carrier moving lengthwise of the leer and having rack-arms projecting at right angles from the carrier and of proper length to receive and support between them sheets of glass, the successive rack-arms being secured to different links of the chain, whereby they are enabled to diverge at the turning-point of the chains; substantially as described.

2. A leer having a carrier which travels through the leer and carries the series of glass sheets, and partitions carried by the carrier and extending substantially across the leer so as to divide it into movable compartments; substantially as described.

3. A leer having therein a series of endless chains with arms projecting transversely therefrom and constituting glass-receiving racks, and partitions also carried by the chains and extending substantially across the leer so as to divide it into compartments; substantially as described.

In testimony whereof I have hereunto set my hand.

JOHN H. LUBBERS.

Witnesses:
W. B. CORWIN,
H. M. CORWIN.